United States Patent
Ji et al.

(10) Patent No.: US 10,349,428 B2
(45) Date of Patent: Jul. 9, 2019

(54) DATA TRANSMISSION METHOD AND DATA TRANSMISSION DEVICE FOR DENSELY LOCATED RECEIVERS IN WIRELESS COMMUNICATION SYSTEM

(71) Applicant: Samsung Electronics Co., Ltd., Gyeonggi-do (KR)

(72) Inventors: Hyoungju Ji, Seoul (KR); Younsun Kim, Gyeonggi-do (KR); Juho Lee, Gyeonggi-do (KR); Youngbum Kim, Seoul (KR); Hyojin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 15/026,166

(22) PCT Filed: Sep. 23, 2014

(86) PCT No.: PCT/KR2014/008850
§ 371 (c)(1),
(2) Date: Mar. 30, 2016

(87) PCT Pub. No.: WO2015/046864
PCT Pub. Date: Apr. 2, 2015

(65) Prior Publication Data
US 2016/0242196 A1 Aug. 18, 2016

(30) Foreign Application Priority Data
Sep. 30, 2013 (KR) ................ 10-2013-0116646

(51) Int. Cl.
*H04W 4/00* (2018.01)
*H04W 72/12* (2009.01)
(Continued)

(52) U.S. Cl.
CPC ..... *H04W 72/121* (2013.01); *H04W 72/1231* (2013.01); *H04W 76/11* (2018.02); *H04W 88/04* (2013.01)

(58) Field of Classification Search
CPC .......... H04W 72/042; H04W 72/0446; H04W 72/0453; H04W 72/0413; H04W 84/12
See application file for complete search history.

(56) References Cited

U.S. PATENT DOCUMENTS

| | | |
|---|---|---|
| 2012/0163235 A1 | 6/2012 | Ho et al. |
| 2013/0208711 A1 | 8/2013 | Van Lieshout et al. |

(Continued)

FOREIGN PATENT DOCUMENTS

| | | |
|---|---|---|
| WO | WO 2013025040 | 2/2013 |
| WO | WO 2013025057 | 2/2013 |
| WO | WO 2013081433 | 6/2013 |

OTHER PUBLICATIONS

PCT/ISA/210 Search Report issued on PCT/KR2014/008850 (pp. 3).

(Continued)

*Primary Examiner* — Atique Ahmed
(74) *Attorney, Agent, or Firm* — The Farrell Law Firm, P.C.

(57) ABSTRACT

A method for transmitting and receiving a signal in a terminal of a mobile communication system, according to one embodiment of the present specification, comprises the steps of: receiving information of another terminal from the other terminal; transmitting, to a base station, a message requesting allocation of an identifier for the other terminal on the basis of the received information of the other terminal; and receiving, from the base station, the message including the identifier allocated for the other terminal. The provided present invention, according to one embodiment of the present specification, allows only the arbitrary receiver (Continued)

to access the base station and receive data therefrom when a plurality of densely located receivers are neighboring each other. At this point, the other receivers can selectively receive a data stream transmitted to each terminal from data channels received by the arbitrary receiver that accesses the base station. To this end, only the arbitrary terminal accessing at least the base station is enabled to allow feedback of the channel.

12 Claims, 15 Drawing Sheets

(51) Int. Cl.
*H04W 76/11* (2018.01)
*H04W 88/04* (2009.01)

(56) References Cited

U.S. PATENT DOCUMENTS

| | | | | |
|---|---|---|---|---|
| 2014/0057670 A1* | 2/2014 | Lim | ................... | H04W 8/005 |
| | | | | 455/509 |
| 2014/0086152 A1* | 3/2014 | Bontu | ................ | H04L 1/1812 |
| | | | | 370/329 |
| 2014/0094212 A1* | 4/2014 | Ahn | ..................... | H04W 4/70 |
| | | | | 455/517 |
| 2014/0098719 A1* | 4/2014 | Kim | ..................... | H04W 4/70 |
| | | | | 370/280 |
| 2014/0177449 A1* | 6/2014 | Novak | .................. | H04W 4/70 |
| | | | | 370/241 |
| 2014/0177537 A1* | 6/2014 | Novak | ............... | H04W 76/023 |
| | | | | 370/329 |
| 2014/0355483 A1 | 12/2014 | Jang et al. | | |
| 2014/0376489 A1* | 12/2014 | Lee | ..................... | H04L 5/0055 |
| | | | | 370/329 |
| 2015/0049732 A1* | 2/2015 | Xue | ..................... | H04L 1/1854 |
| | | | | 370/330 |
| 2015/0071189 A1* | 3/2015 | Park | .................... | H04W 56/00 |
| | | | | 370/329 |
| 2017/0208577 A1* | 7/2017 | Novak | ............... | H04W 72/042 |

OTHER PUBLICATIONS

PCT/ISA/237 Written Opinion issued on PCT/KR2014/008850 (pp. 5).
3GPP TSG-RAN WG1 Meeting #74, Barcelona, Spain, Aug. 19-23, 2013, D2D Communication within network coverage, pp. 4.

* cited by examiner

DATA TRANSMISSION METHOD AND DATA TRANSMISSION DEVICE FOR DENSELY LOCATED RECEIVERS IN WIRELESS COMMUNICATION SYSTEM

TECHNICAL FIELD

An embodiment of the present invention relates to a method and apparatus for communication between a base station and a plurality of densely located terminals in a wireless communication system. In detail, the present invention relates to a method for one of the densely located terminals to receive the scheduling information about the data for the densely located terminals in the state of being connected to the base station and for physically separated receivers to receive the data transmitted to the terminal selectively and to perform feedback in correspondence thereto.

BACKGROUND ART

Mobile communication systems were developed for the purpose of providing mobile users with communication services. With the rapid advance of technologies, the mobile communication systems have evolved to the level capable of providing high speed data communication service beyond the early voice-oriented services.

Recently, standardization for a Long Term Evolution Advanced (LTE-A) system, as one of the next-generation mobile communication systems, is underway in the $3^{rd}$ Generation Partnership Project (3GPP). The LTE-A system is being developed continuously to improve performance and meet the requirements for high speed packet-based communication at a data rate 3~10 times higher than the currently available data rate.

In the following, the term "LTE system" is used in the meaning to include the legacy LTE system and the LTE-A system.

With the advance of mobile communication systems, there is an increasing need of a communication method that is efficient in a situation where a certain user uses a plurality of terminals.

DISCLOSURE OF INVENTION

Technical Problem

The present invention has been proposed to solve the above problems and aims to provide a method for allowing a user to use a plurality of terminals efficiently for communication. Meanwhile, the space occupied by a user has very high spatial correlation; thus, the operation states of the terminals carried by the user are very similar to each other, but the base station handles the respective terminals individually without awareness that the terminals are owned by one user. The present invention aims to provide a method for facilitating communication while reducing the system overhead in a situation where a plurality of closely located terminals is owned by one user.

Solution to Problem

In accordance with an aspect of the present invention, a signal transmission/reception method of a terminal in a mobile communication system includes receiving information on other terminals from the other terminals; transmitting to a base station a message requesting allocation of identifiers of the other terminals based on the information of the other terminals; and receiving a message including the identifiers allocated to the other terminals from the base station.

In accordance with another aspect of the present invention, a signal transmission/reception method of a base station in a mobile communication system includes receiving a message including an identifier allocation request for other terminals based on information about other terminals from a terminal and transmitting to the terminal the identifiers allocated to the other terminals based on the identifier allocation request for the other terminals.

In accordance with still another aspect of the present invention, a signal transmission/reception method of a terminal in a mobile communication system includes transmitting information on the terminal to other terminal and receiving a message including an identifier allocated by a base station based on the information of the terminal from the other terminal.

Advantageous Effects of Invention

In a proposed method according to an embodiment of the present invention, among a plurality of closely located receivers, a certain receiver connects to the base station to receive data. At this time, the other receivers may receive the data streams transmitted to the respective terminals selectively among the data channels received by the receiver connected to the base station, and the terminal connected to the base station provides channel feedback. The method according to an embodiment of the present invention is capable of reducing system overhead caused by the connection of plural terminals to the base station and power loss of the terminals by limiting the number of terminals transmitting signals to the base station.

MODE FOR THE INVENTION

Figure 1:
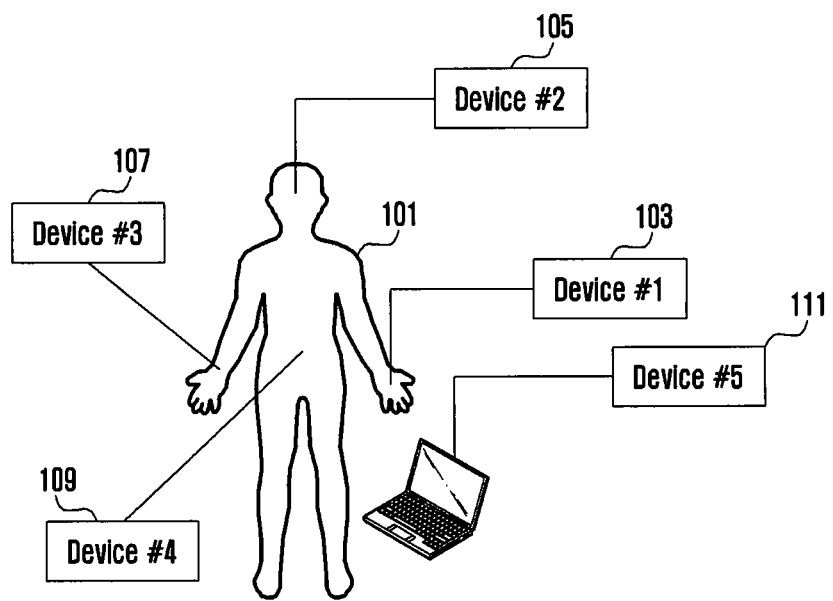
FIG. 1 is a diagram illustrating terminals to which this embodiment is applied.

Detailed description of well-known functions and structures incorporated herein may be omitted to avoid obscuring the subject matter of the present invention. This aims to omit unnecessary description so as to make clear the subject matter of the present invention.

For the same reason, some of elements are exaggerated, omitted, or simplified in the drawings and, in practice, the elements may have sizes and/or shapes different from those shown in drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

According to an embodiment of the present invention, the method includes transmitting information in advance among a plurality of closely located terminals; connecting, at a terminal among the closely located terminals, to a base station to transmit information on the closely located terminals and receive configuration information; receiving, at the connected terminal, scheduling information about the data for the closely located terminals; receiving, at the respective terminals, data streams transmitted thereto selectively on the scheduled data channel; transmitting, at the connected terminal, channel information of the terminals to the base station; and transmitting an acknowledgement channel corresponding to the data channels for the plural terminals.

According to another embodiment of the present invention, a terminal includes a transceiver for transmitting/receiving signals to/from a base station and a control unit for controlling the transceiver, generating a signal for connecting to the base station, and commanding reception of signals.

Exemplary embodiments of the present invention are described with reference to the accompanying drawings in detail.

Detailed description of well-known functions and structures incorporated herein or not related to the embodiments of the present invention may be omitted to avoid obscuring the subject matter of the present invention. This aims to omit unnecessary description so as to make the subject matter of the present invention clear.

Detailed description of well-known functions and structures incorporated herein may be omitted to avoid obscuring the subject matter of the present invention. Exemplary embodiments of the present invention are described with reference to the accompanying drawings in detail.

According to an embodiment of the present invention, a communication method of an LTE system includes transmitting a downlink signal from a base station to a terminal and transmitting an uplink signal from the terminal to the base station. The LTE downlink signal includes a data channel having information, a control channel carrying control signals, and a Reference Signal (RS) for channel measurement and channel feedback. The LTE uplink signal includes a data channel having information, a control channel carrying feedback information or control signals, and a Sounding Reference Signal (SRS) for the base station to measure the channel of a terminal.

The LTE base station may transmit data and control information through a Physical Downlink Shared Channel (PDSCH) and a Downlink Control Channel (DL CCH) respectively.

The uplink is comprised of data and control channels transmitted from the terminal to the base station, and the data and control channels may be transmitted through a Physical Uplink Shared Channel (PUSCH) and a Physical Uplink Control Channel (PUCCH) respectively.

The LTE eNB may transmit various reference signals such as Common Reference Signal (CRS), Channel State Information Reference Signal (CSI-RS), and Demodulation Reference Signal (DMRS).

The CRS is transmitted across a whole downlink band in order for all terminals within the cell to demodulate signals and measure channels. In order to reduce the resource amount for CRS transmission, the base station transmits the DMRS in a region scheduled for the terminal as a terminal-specific reference signal and the CSI-RS on the time and frequency axes for channel information acquisition.

The terminal transmits the data channel (PUS,CH) and control channel (PUCCH) based on the terminal-specific reference signal (DMRS) and the Sounding Reference Signal (SRS) for uplink channel measurement. The SRS is transmitted at the last symbol of a subframe, and the PUSCH and PUCCH cannot be transmitted along with SRS simultaneously. Typically, the PUCCH is transmitted at the edges of the uplink bandwidth, and the PUSCH is transmitted across the whole band.

FIG. 1 shows terminals to which this embodiment is applied.

Referring to FIG. 1, the legacy communication system has been designed and developed in consideration of the situation where a user 101 carries one terminal to connect to a network to receive data. It is a recent tendency that a user 101 carries one or more terminals, and research shows that the average user carries 2.9 terminals. Accordingly, the base station has to manage about 3 times more the number of terminals than the number of subscribers.

The user 101 may carry wearable devices worn at a part of the body as denoted by reference numbers 105, 107, and 109 as well as a smartphone or mobile terminal held in hand as denoted by reference number 103. The user may also carry a laptop or tablet as denoted by reference number 111. In the case that the user carries multiple terminals, it is typical that the terminals carried by the user 101 are placed in the range of 0.5 m to 1 m around the user and move simultaneously.

Figure 2:
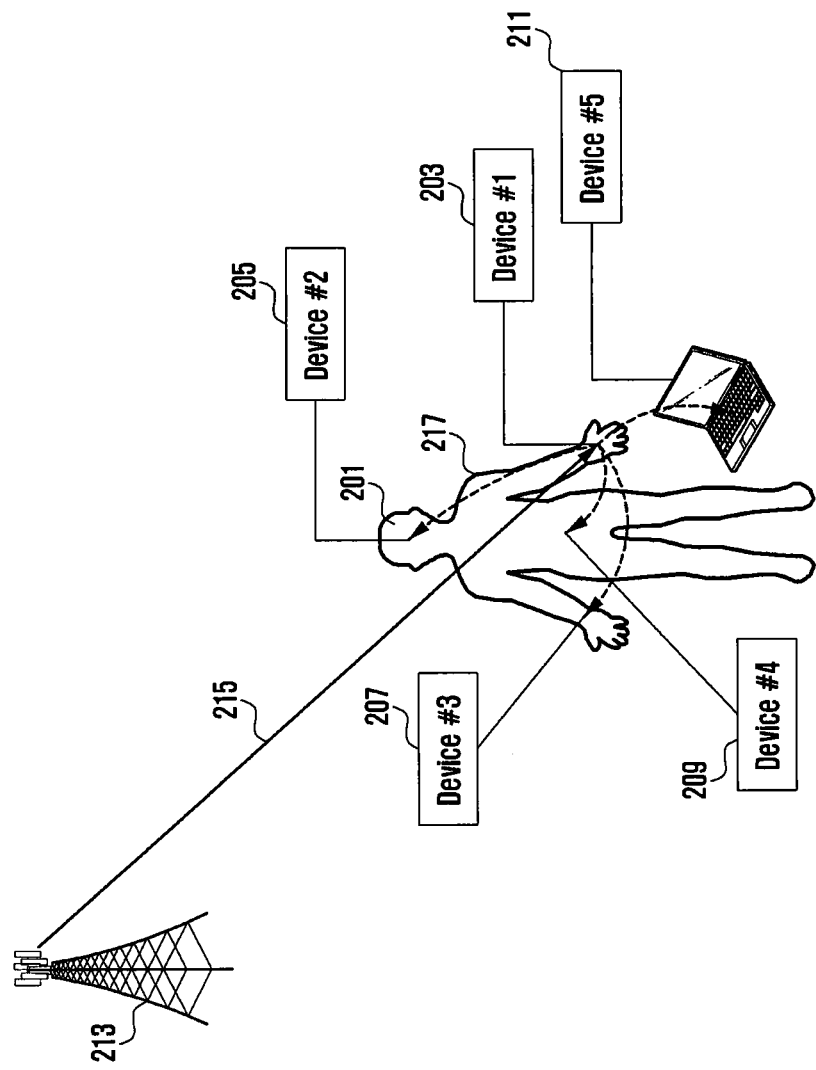
FIG. 2 is a diagram illustrating a network-terminal communication system according to an embodiment of the present invention.

FIG. 2 is a diagram illustrating a network-terminal communication system according to an embodiment of the present invention.

Referring to FIG. 2, although the user 201 has more than one terminal, it is typical to configure the terminals 203, 205, 207, 209, and 211 to communicate using different communication protocols 217. In this case, the user 201 may use a representative terminal 203 to receive the data 215 for the terminals (including itself) connected to the base station 213 on behalf of them such that the other terminals 205, 207, 209, and 211 connected to the representative terminal 203 using another communication protocol (e.g. Bluetooth and Wi-Fi) receive the data forwarded by the representative terminal 203.

In order to accomplish this process, the respective terminals 203, 205, 207, 209, and 211 have to have the application for supporting the process installed such that one terminal 203 requests to the base station for data on behalf of the other terminals. If data are received, the terminal 203 decodes the received data, encodes the data in the format suitable for the protocol 217 for communication with the other terminals, and forwards the encoded data to the corresponding terminals. In this case, since two different protocols are used, it is necessary to perform encoding and decoding operations. Since multiple terminals connect to one terminal, the representative terminal 203 has to repeat the corresponding operation for the respective terminals and this may cause a data bottleneck problem depending on the communication protocol in use.

This data bottleneck means that each terminal receives data at a low data rate compared with the case of receiving data from the base station directly and the user's sensible data rate drops; and, the increased battery power consumption causes power loss.

Figure 3:
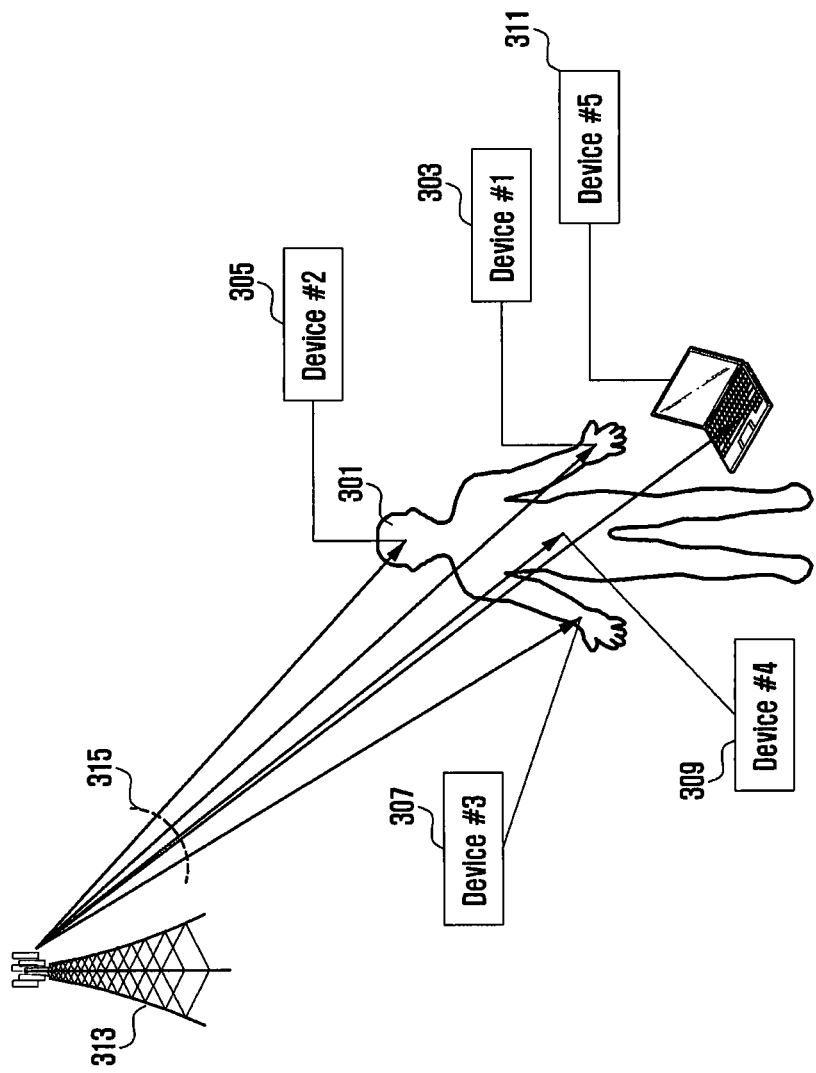
FIG. 3 is a diagram illustrating a network-terminal communication system according to an embodiment of the present invention.

FIG. 3 is a diagram illustrating a network-terminal communication system according to an embodiment of the present invention.

FIG. 3 is directed to a method for the terminals 303, 305, 307, 309, and 311 to connect to the base station 313 directly to receive data unlike the method of FIG. 2. This method is characterized in that the respective terminals 303, 305, 307, 309, and 311 connect to the base station 313 individually, and the base station 313 handles them as independent terminals and thus schedules data 315 per terminal.

In this case, the data bottleneck as observed in FIG. 2 does not occur, and the base station may guarantee high data rates for the terminals 303, 305, 307, 309, and 311 fairly. However, because the large number of terminals 303, 305, 307, 309, and 311 request to the base station 313 for data transmission, the signaling overhead increases in proportion of the number of terminals; the high power consumption of the terminals 303, 305, 307, 309, and 311 for data transmission to the base station 313 causes battery consumption at all of the terminals 303, 305, 307, 309, and 311 unlike the situation of FIG. 2. However, the case of the single user-owned densely located terminals considered in the present invention has some features.

One of those features is that the terminals carried by a single user are close spatially so as to show similar channel properties. Also, they are very similar to each other in spatial correlation and channel distribution effect in the receiver and thus likely to use the same transmission scheme. Furthermore, because the terminal has to perform handover between base stations while the user is on the move, when a single user carries multiple terminals, the terminals perform handover individually, thereby increasing handover signaling in spite of their moving in the same pattern as described above. This problem will become worse in future if the number of terminals carried by the average user increases; therefore, there is need of a method to compensate for this.

Figure 4:
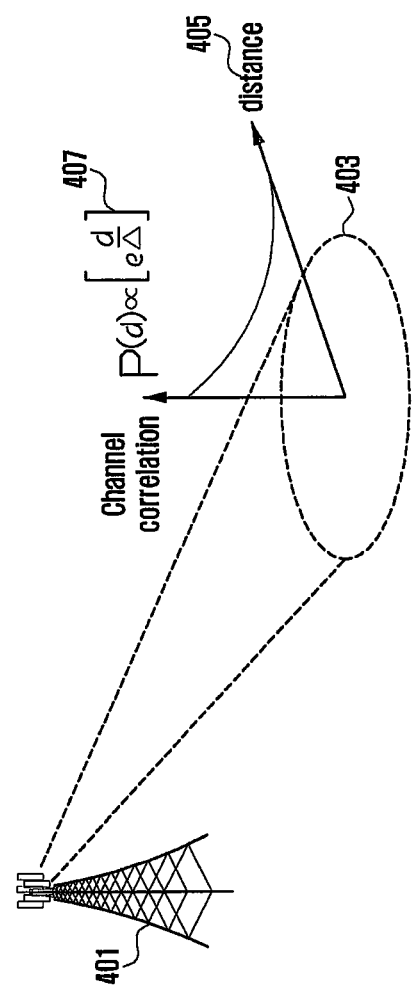
FIG. 4 is a diagram illustrating the radio channel properties according to an embodiment of the present invention.

FIG. 4 is a diagram illustrating the radio channel properties according to an embodiment of the present invention.

Referring to FIG. 4, it is necessary to check the channel properties of the densely located terminals to control those terminals as described above. Typically, the channel correlation decreases exponentially in proportion to the distance when the electric wave transmitted by a transmitter 401 arrives at a certain position 403. Results obtained from a plurality of experiments show that, typically, the distance at which channel correlation reaches about 50% is 30~50 m in an outdoor environment and 4~6 m in an indoor environment. Accordingly, the channel correlation in a radius of 1 m around a certain point is about 99% in the outdoor environment and about 90% in the indoor environment. This means that channels do not vary almost in the range of 1 m in an outdoor environment. In view of energy transmission of the base station, if a base station uses an antenna pattern being allocated 50% or more of its transmission power and having a beam width of 10 degrees, the radius showing 50% or more of the reception power at a distance of 10 m from the base station is about 1.74 m, and the radius showing 50% or more of the reception power at the distance of 50 m from the base station is about 8.72 m; thus, it can be expected that the reception power in the radius of 1 m does not vary and the channel properties are similar within that range. In the case of the angular distribution of the reception electric wave of the receiver, because the reception signals are uniformly distributed across 360 degrees, it is possible to receive signals sufficient to detect the target signal of the receiver in the vicinity of the user even when considering the screening effect of the human body; thus, the terminal can receive the target signals even though the base station transmits the signals in the same transmission mode. As described above, the electric signal that the same transmitter 401 transmits at a specific location 403 have similar channel status at least in part.

Figure 5:
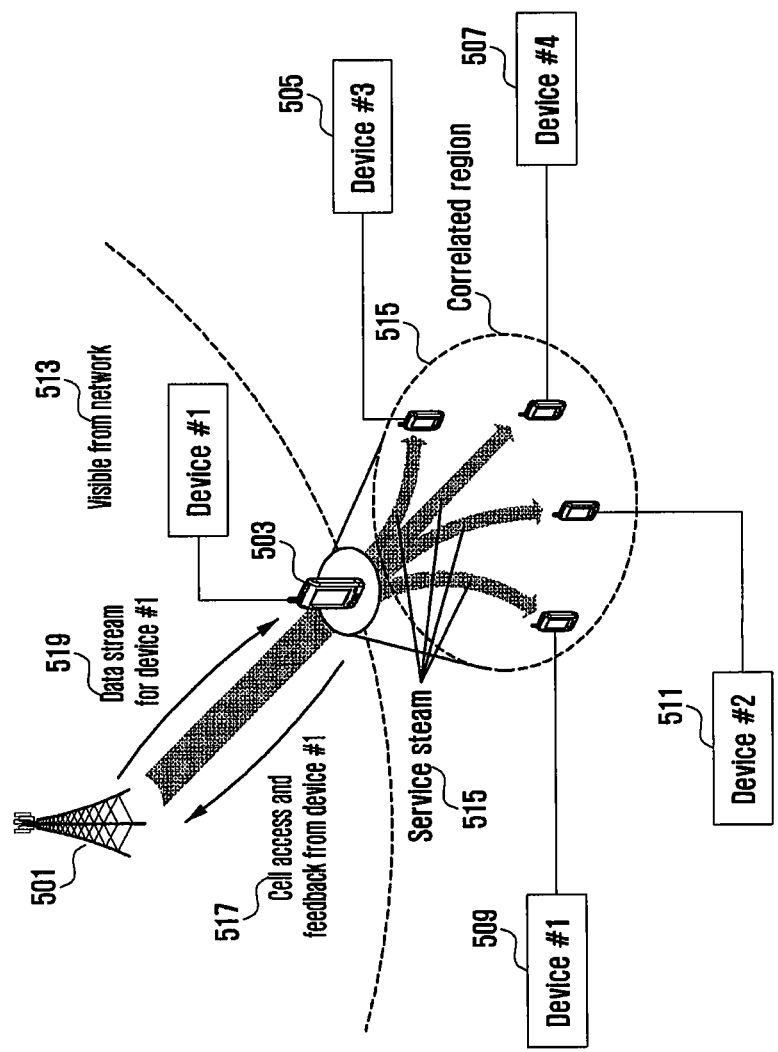
FIG. 5 is a diagram illustrating a data transmission method proposed in the present invention.

FIG. 5 is a diagram illustrating a data transmission method proposed in the present invention.

Referring to FIG. 5, the data transmission method for densely located terminals to the base station according to an embodiment of the present invention is performed in such a way that a terminal 503 acquires or receives the information and configuration on the densely located terminals and connects to the base station 501 based on the information and configuration (517). In this embodiment, the information and configuration of the terminals may include identifiers for identifying the terminals. The configuration of the terminals may include the communication protocols supported by the terminals.

The base station 501 transmits the scheduling information and data 519 for the connected terminal 503, but the service streams 515 for the densely located terminals 505, 507, 509, and 511 may be included in the data 519 transmitted to the connected terminal 503.

The terminals 505, 507, 509, and 511 receive in advance the configuration information from the connected terminal 503 and receive the service streams 515 addressed thereto in the data signal 519 of the terminal 503 connected to the base station 501. In an embodiment, the terminals 503 and 509 may be the same terminal physically or logically.

For this purpose, only the terminal 503 connected to the base station 501 transmits its channel information and the feedback information corresponding to the data transmission to the base station, while the other terminals 505, 507, 509, and 511 may not transmit any channel or feedback corresponding to the data transmission to the base station 501. In an embodiment, although the base station 501 is aware of the presence of only the terminal 503 connected thereto with its identity number as denoted by reference number 513, the other terminals 505, 507, 509, and 511 are actually being connected to the base station 501. In view of the transmission channel, only one terminal 503 is visible to the base station 501, which makes it possible to reduce the system overhead; and the service streams 515 addressed to multiple terminals are multiplexed on one data stream 519 transmitted to the terminal 503, which makes it possible to transmit data addressed to multiple terminals on a single data channel. Various embodiments of the present invention are proposed to accomplish this.

Figure 6:
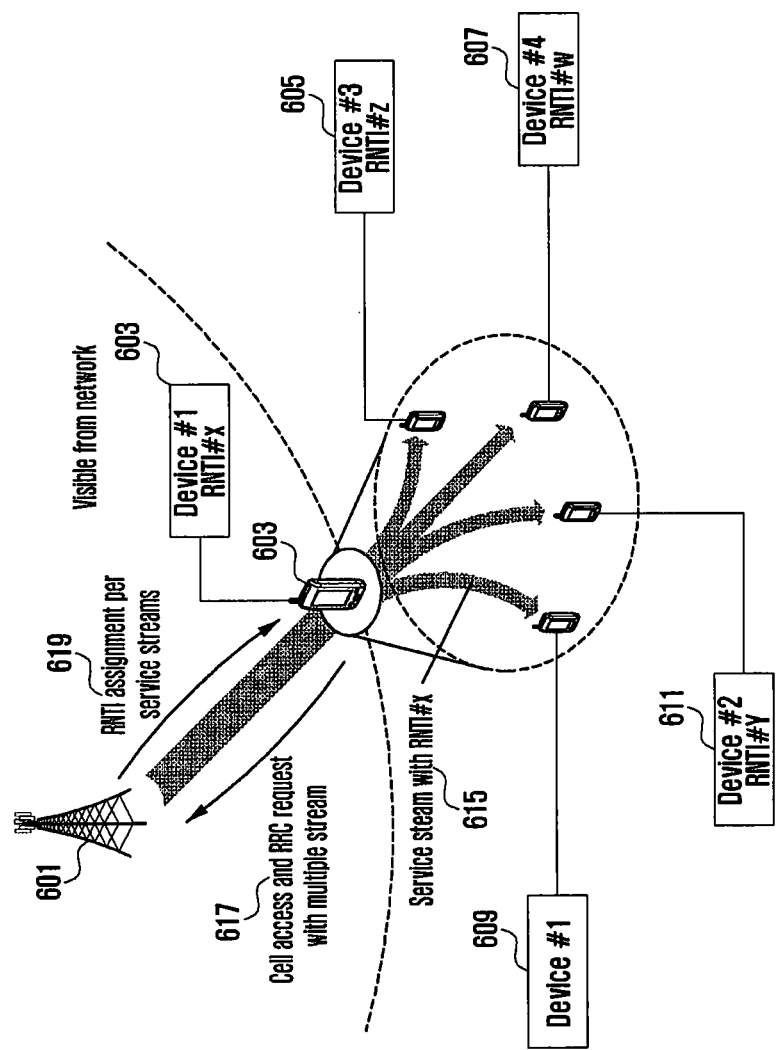
FIG. 6 is a diagram illustrating a data transmission method according to the first embodiment of the present invention.

FIG. 6 is a diagram illustrating a data transmission method according to the first embodiment of the present invention.

According to the first embodiment of FIG. 6, a terminal 603 connects to a base station 601 to receive one or more Radio Network Temporary Identities (RNTIs) and receive data transmitted by the base station 601 using the RNTIs.

The terminal 603 that has been assigned the RNTIs informs the densely located terminals 605, 607, and 611 of the RNTIs in order for them to identify the data transmitted by the base station. In this case, the base station 601 allocates a plurality of RNTIs to one terminal as if multiple virtual terminals exist in the single terminal.

If the terminal 603 becomes the representative terminal, it checks in advance the configuration information from the densely located terminals 605, 607, 609 and 611. In this embodiment, the terminals 603 and 605 may be the same terminal physically or logically.

Afterward, the terminal 603 attempts an initial attach to the base station 601 to be allocated an RNTI. Then the terminal 603 makes a request for additional RNTIs based on the densely located terminal information. The additional RNTIs are requested through higher layer scheduling or extra PRACH. In order to use the extra PRACH, the base station 601 may distinguish the PRACH resource for initial attach of the terminal and the PRACH resource for any extra RNTI. This is to request to the base station for the extra RNTI when a new terminal enters a predetermined range from the terminal 603. The terminal 603 transmits higher layer information matching the respective RNTIs through higher layer signaling in order for the service streams to be delivered correctly to the respective terminals.

The base station 601 applies the RNTIs according to the data or services selectively to transmit them to the terminal 603, and the terminal 603 notifies the neighboring terminals 605, 607, 609, and 611 of the RNTIs allocated by the eNB in order for the terminals to identify the data streams addressed to them on the data channel 619 transmitted by the base station 601.

The base station 601 configures control and data channels based on the RNTIs, and each terminal attempts decoding of the control channel with its RNTI and, when the decoding is successful, receives the data channel indicated by the control channel. The terminal 603 connected to the base station 601 receives control channels for all RNTIs transmitted by the base station and determines whether to forward the control channels based on the RNTIs allocated by the base station, but it receives the data channel using its unique RNTI and transmits acknowledgement corresponding to the data channel to the base station. This may be interpreted that the acknowledgements corresponding to all of the data channels transmitted by the base station 601 using the multiple RNTIs are bundled to be transmitted at a time. That is, the terminal 603 may determine that if it succeeds to decode the data channel the data channels for other densely located terminals decode their data channel successfully under the assumption that the reception performances of the neighboring terminals are similar to each other.

Another method is for the terminal 603 connected to the base station to transmit the acknowledgements of the respective terminals. This method may include a method of concatenating acknowledgement channels and transmitting the concatenation result and a method of transmitting a representative value acquired through XOR operation on the acknowledgment indication values in unit of bit.

Also, it is possible to configure such that the terminal 603 connected to the base station transmits the channel feedback and the base station 601 applies the channel values transmitted by the corresponding terminal to all RNTs it has allocated.

The proposed method is advantageous in that a single terminal is allocated identifiers of multiple terminals from the base station so as to operate as if the respective subframes are transmitted to virtual terminals; thus, the base station is capable of scheduling multiple terminals based on the feedback and channel information transmitted by the representative terminal. Accordingly, it is possible to maintain the amount of the feedback corresponding to the data transmission and channel information at the level for a single terminal even though the number of densely located terminals increases.

Also, the proposed method makes it possible for the terminal 603 to receive the information related to the data to be received by the neighboring terminals 605, 607, and 611 and forwards the received information to the base station 601. The base station may transmit the data addressed to the neighboring terminals 605, 607, and 611 in the resource regions corresponding to the RNTIs allocated to the neighboring terminals 605, 607, and 611.

Figure 7:
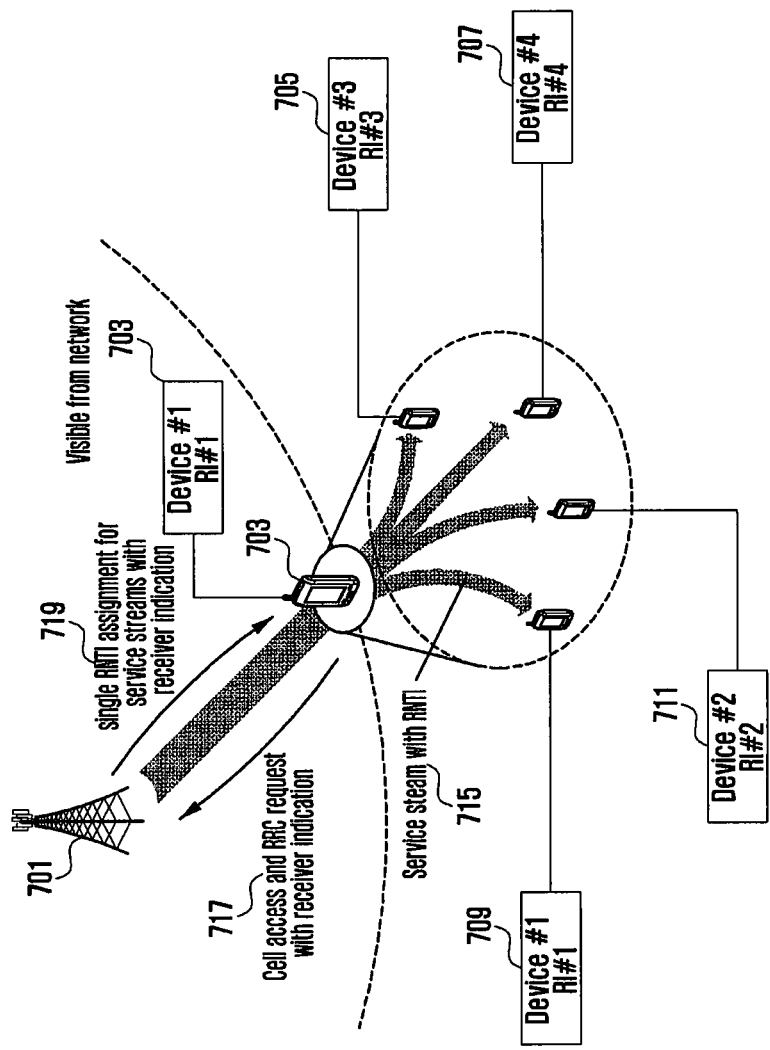
FIG. 7 is a diagram illustrating a data transmission method according to the second embodiment of the present invention.

FIG. 7 is a diagram illustrating a data transmission method according to the second embodiment of the present invention.

According to the second embodiment of FIG. 7, a terminal 703 connects to a base station 701, which allocates Receiver Indicators (RIs) for preconfigured densely located terminals 705, 707, and 711. In this case, the base station 701 recognizes that the terminal 703 allocated one terminal identifier has a plurality of receivers 705, 707, and 711.

For example, if the terminal 703 is the representative terminal, it checks the configuration information of the densely located terminals 705, 707, and 711 in advance.

Afterward, the terminal 703 attempts an initial attach to the base station 701 to receive an RNTI allocated thereto.

Then the terminal 703 requests to the base station 701 for RIs based on the information on the densely located terminals. Accordingly, the base station 701 recognizes that the terminal has a plurality of receivers.

The terminal 703 transmits higher layer information matching the RIs through higher layer signaling such that the terminal allocated the RI(Receiver indicator)s receives correct service streams.

The base station 701 transmits to the terminal 703 the data or service with the RIs that the terminal 703 notifies to the neighboring terminals 705, 707, and 711; thus, with the RIs the neighboring terminals 705, 707, and 711 identify the data streams addressed thereto in the data channel 719 transmitted by the base station 701.

Although the base station configures the control and data channels with one RNTI, it adds an RI to the corresponding control channel to indicate the destination of the control channel.

The terminal receives the control channel with a common RNTI and checks the RI of the received control channel to determine the receiver to which the control channel is transmitted. The receiver which has received the control channel addressed thereto receives the data channel indicated by the control channel. The terminal 703 connected to the base station 701 receives data with the common RNTI regardless of the RI and transmits the acknowledgement corresponding to the data to the base station. This is similar to a method of bundling the acknowledgements corresponding to all data channels transmitted implicitly with multiple RNTIs.

The terminal 703 connected to the base station 701 transmits the acknowledgements generated for the respective terminals. This method may include a method of concatenating acknowledgement channels and transmitting the concatenation result and a method of transmitting a representative value acquired through XOR operation on the acknowledgment indication values in unit of bit. In the case of channel feedback, it includes that the terminal 703 connected to the base station 701 transmits the channel feedback such that the base station 701 applies the channel value transmitted by the corresponding terminal to all RIs it has allocated.

The proposed method is implemented such that a terminal is allocated one common RNTI and a plurality of receiver identifiers for a plurality of receivers from a base station and sends the service stream-specific receiver identifiers to the corresponding receivers; thus, the base station is capable of transmitting receiver-specific data streams based on the feedback and channel information transmitted by the terminal.

Figure 8:
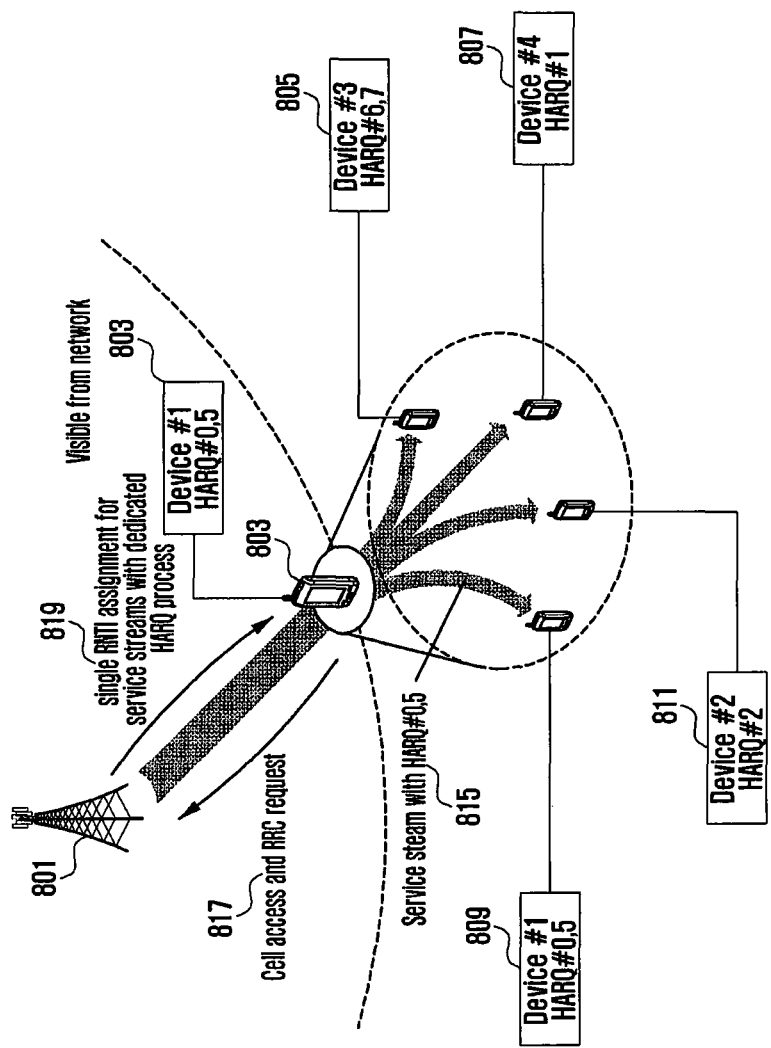
FIG. 8 is a diagram illustrating a data transmission method according to the third embodiment of the present invention.

FIG. 8 is a diagram illustrating a data transmission method according to the third embodiment of the present invention.

According to the third embodiment of FIG. 8, the terminal 803 connected to the base station 801 is assigned service stream-specific HARQ process numbers for the densely located terminals 805, 807, and 811. In this case, it appears to the base station 801 as if data is transmitted by only one terminal which identifies the data addressed to the respective terminals based on the HARQ process' identifiers.

For example, if the terminal 803 becomes a representative terminal, it checks in advance the configuration information from the densely located terminals 805, 807, and 811. Afterward, the terminal 803 attempts an initial attach to receive an RNTI allocated thereto.

Afterward, the terminal 803 requests to the base station 801 to manage the data addressed to the densely located terminals 805, 807, and 811 per service stream-specific HARQ process. Accordingly, it appears to the base station 801 as if the terminal transmits data through service stream-specific HARQ processes.

The terminal 803 transmits higher layer information matching the respective terminals through higher layer signaling such that the service streams addressed to the terminals are transmitted correctly through the service stream-specific HARQ processes. In this way, the base station 801 transmits the data or service to the terminal 803 in a HARQ process-specific manner, and the terminal 803 notifies the densely located terminals 805, 807, and 811 of the HARQ process IDs allocated by the base station in order for the terminals to identify the data channels addressed thereto from data channel 819 transmitted by the base station 801.

In an embodiment, although the base station 801 configures the control and data channels with one RNTI, the HARQ process ID included in the control channel indicates the receiver to which the control channel is addressed. Each terminal receives control channels with the common RNTI and checks the HARQ process ID included in the control channel to determine whether the control channel is addressed to it. If it is determined that the control channel is addressed to the terminal, the corresponding terminal receives the data channel indicated by the corresponding control channel.

Only a representative terminal among the densely located terminals can receive the data channel per HARQ process because the HARQ process is allowed per scheduling. The positive feedback corresponding to the data channel may be directly transmitted by the terminal which has received the data channel successfully. Because the respective terminals transmit data on the resource allocated to the terminal 803 at different transmission occasions, it appears to the base station 801 as if only the terminal 803 is transmitting the data continuously. In the case of channel feedback, it includes that the terminal 803 connected to the base station 801 transmits the feedback channel and the respective terminals transmit the feedback channels to the base station at their transmission occasions.

Figure 9:
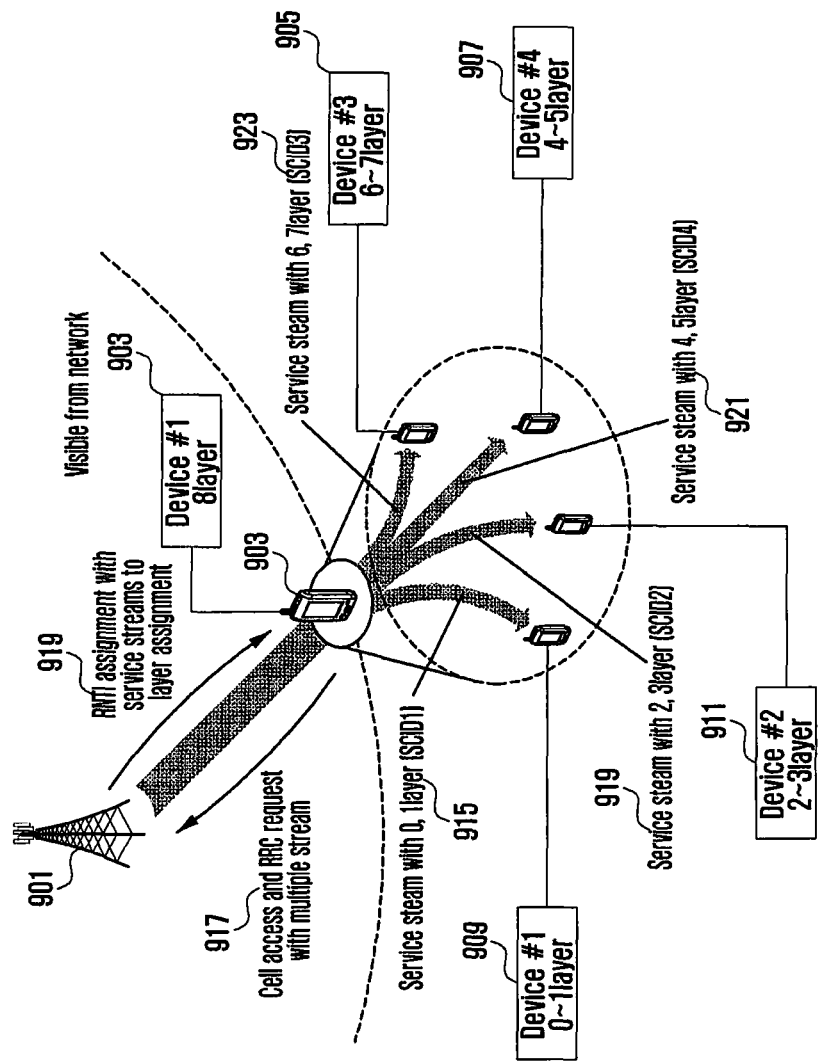
FIG. 9 is a diagram illustrating a data transmission method according to the fourth embodiment of the present invention.

FIG. 9 is a diagram illustrating a data transmission method according to the fourth embodiment of the present invention.

According to the fourth embodiment of FIG. 9, a terminal 903 connects to a base station 901 to allocate data channel layers to the service streams for densely located terminals 905, 907, and 911. In this case, it appears to the base station 901 as if there is only one terminal 903 to serve; thus, the base station 901 performs spatial multiplexing on the service streams with different reference signals as denoted by reference number 919 in order for the terminal 905, 907, 909, and 911 to receive the terminal-specific data through different layers using the reference signals.

For example, if the terminal 903 becomes a representative terminal, it receives the configuration information from the densely located terminals 905, 907, and 911.

Afterward, the terminal 903 attempts an initial attach to the base station 901 to receive an RNTI allocated thereto. Then the terminal 903 requests to the base station 901 to transmit the service streams addressed to the densely located terminals 905, 907, and 911 on different data channel layers.

Accordingly, it appears to the base station 901 as if one terminal transmits the data through different transmission layers depending on the service stream.

The terminal 903 receives higher layer information matching the terminals through a higher layer signal, i.e. DMRS port and scrambling ID (SCID) information, such that the service streams are transmitted to the respective terminals through the corresponding transmission layers. In this way, the base station 901 transmits the data or service on the layers identified with DMRS ports to the terminal 903, and the representative terminal 903 notifies the neighboring terminals 905, 907, and 911 of the layer information or DMRS port and SCID information allocated by the eNB in order for them to identify the layer carrying data streams transmitted by the base station 901 on the channel 919.

Although the base station 901 configures the control and data channels with one RNTI, the transmission port information included in the control channel indicates the receiver to which the control channel is addressed. In order to avoid inter-terminal interference, the service streams transmitted on the different layers may be scrambled with the SCID. Each terminal receives control channels with the common RNTI and checks the layer information or DMRS port information to identify the layer allocated thereto. If it is determined that the control channel is addressed to the terminal, the corresponding terminal receives the data channel indicated by the corresponding control channel and performs descrambling and decoding on a specific layer of the data channel using its own DMRS port and SCID.

The terminal 903 connected to the base station 901 may make a transmission decision, regardless of the receipt of data with the RNTI allocated thereto, to notify the base station whether the data channel is received successfully. This is similar to a method of bundling the acknowledgements corresponding to all data channels transmitted implicitly with multiple RNTIs. It is also possible for the terminal having the DMRS port with the lowest index to transmit to the base station 901 the acknowledgement indicating whether the data channel is received successfully. This method may include a method of concatenating acknowledgement channels and transmitting the concatenation result and a method of transmitting a representative value acquired through XOR operation on the acknowledgment indication values in unit of bit. In the case of channel feedback, it includes to select a representative terminal for transmission to the base station.

Figure 10:
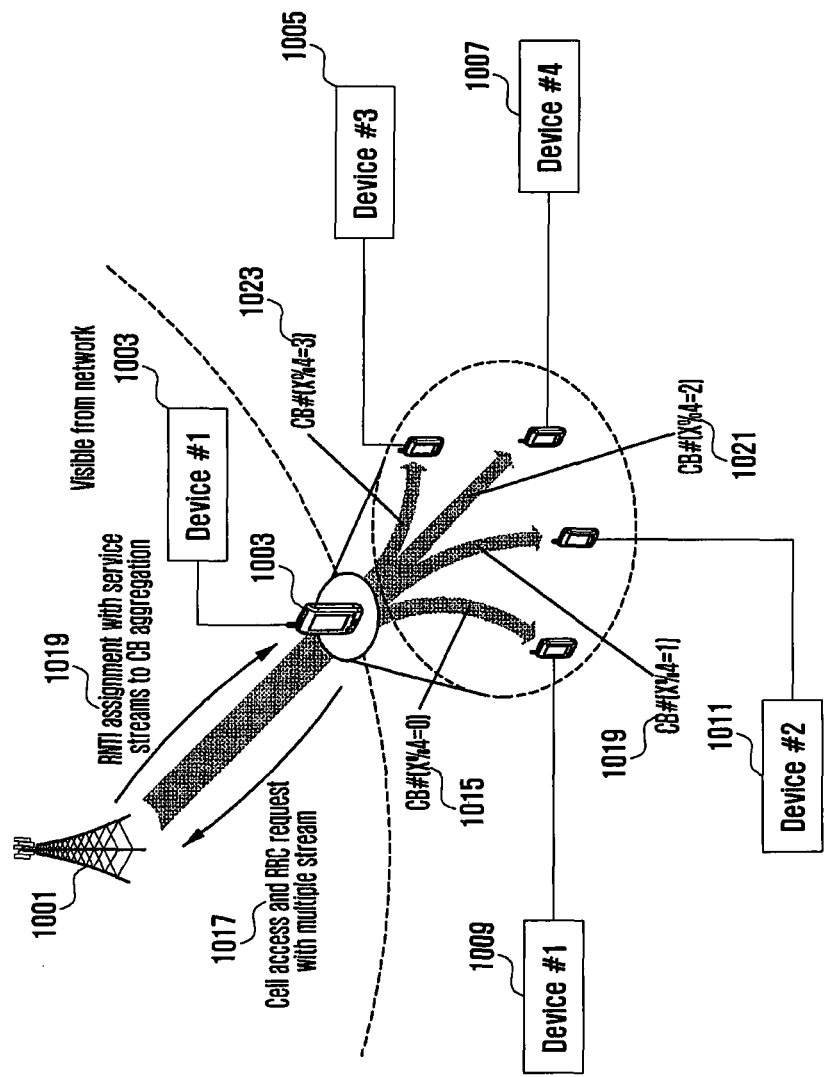
FIG. 10 is a diagram illustrating a data transmission method according to the fifth embodiment of the present invention.

FIG. 10 is a diagram illustrating a data transmission method according to the fifth embodiment of the present invention.

According to the fifth embodiment of FIG. 10, a representative terminal 1003 connects to a base station 1001 and requests to the base station 1001 to multiplex the service streams to densely located terminals 1005, 1007, and 1011 on the data channel 1019 transmitted to the terminal 1003 in unit of codeblock. In this case, the base station 1001 multiplexes the service streams addressed to the neighboring terminals 1005, 1007, and 1011 on the data channel transmitted to the representative terminal 1003 such that each terminal receives the data channel and performs demodulation on the position carrying the codeblock addressed thereto to receive the data transmitted thereto.

Typically, one data channel is divided into a plurality of codeblocks, and this means that a plurality of codeblocks forms one data channel.

For example, if the terminal 1003 becomes a representative terminal, it checks in advance the configuration information from the densely located terminals 1005, 1007, and 1011.

Afterward, the terminal 1003 attempts an initial attach to establish data connection 1017 to receive an RNTI allocated thereto. Then the terminal 1003 requests to the base station 1001 to transmit the service streams addressed to the densely located terminals as different codeblocks on the data channel. Accordingly, it appears to the base station 1001 as if one terminal receives multiple service streams in unit of codeblock on one data channel.

The terminal 1003 receives higher layer information matching the respective terminals, i.e. codeblock multiplexing scheme information, through higher layer signaling in order for the respective terminals to receive the service streams with the codeblock indices allocated for the service streams. The base station 1001 determines the codeblock index for the data or service to transmit and notifies the terminal 1003 of the corresponding information.

At this time, the terminal 1003 notifies the neighboring terminals 1005, 1007, and 1011 of the codeblock multiplexing information received from the base station in order for them to receive and identify the terminal-specific codeblocks in the data channel 1019 transmitted by the base station 1001.

The base station 1001 instructs only the representative terminal 1003 to configure the control and data channels based on the RNTI. The terminals receive the common RNTI and data channels indicated by the received control channel. Each terminal decodes the data channel selectively using the codeblock information allocated thereto. The representative terminal 1003 makes a transmission decision based on the RNTI regardless of the existence of the codeblock allocated thereto and notifies the base station whether the data channel is received successfully. This is similar to a method of bundling the acknowledgements corresponding to all data channels transmitted implicitly with multiple RNTIs.

It is also possible for the terminal having the lowest index in the codeblock indicated by the control channel to transmit to the base station an acknowledgement indicating whether the data is received successfully. This method may include a method of concatenating acknowledgement channels and transmitting the concatenation result and a method of transmitting a representative value acquired through XOR operation on the acknowledgment indication values in unit of bit. In the case of channel feedback, it includes to select a representative terminal for transmission to the base station in the same way.

Figure 11:
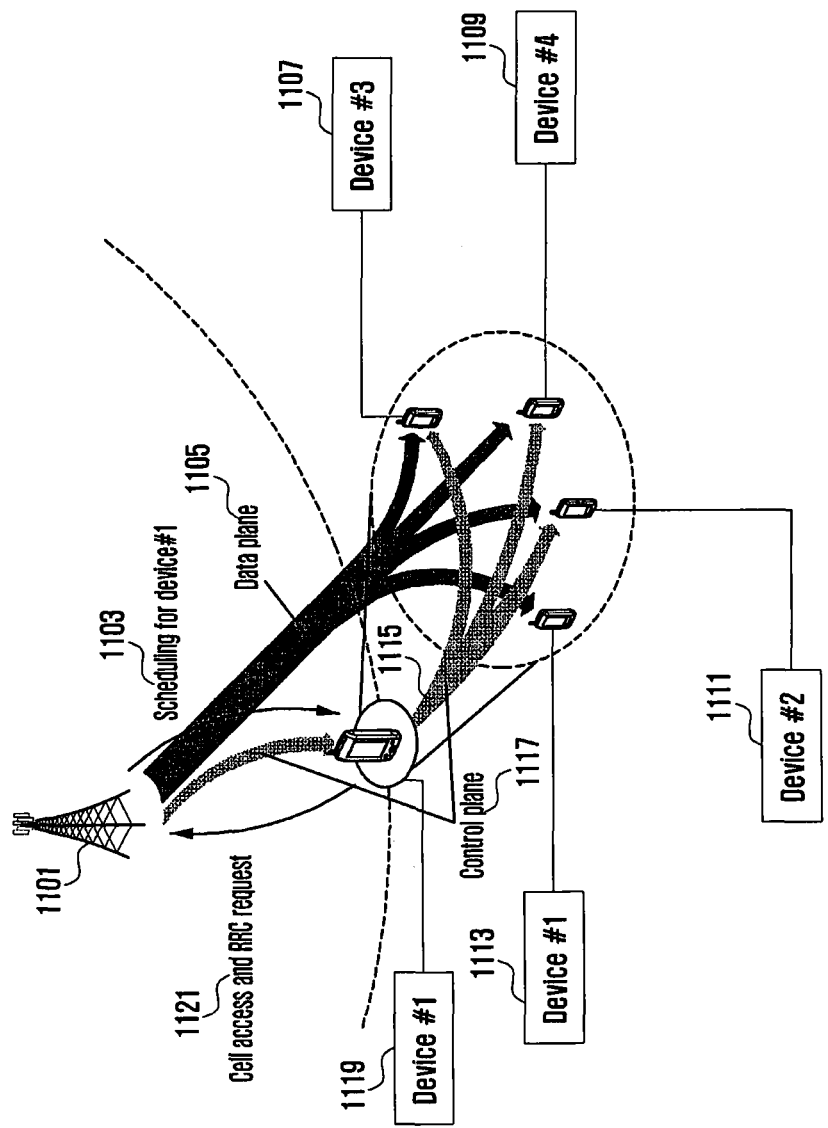
FIG. 11 is a diagram illustrating a data transmission method according to the sixth embodiment of the present invention.

FIG. 11 is a diagram illustrating a data transmission method according to the sixth embodiment of the present invention.

According to the sixth embodiment of FIG. 11, a representative terminal 1119 receives in advance a control channel from a base station 1101, configures a control channel 1115 for a plurality of terminals 1107, 1109, and 1111 based on the received control channel, and transmits the configured control channel to the terminals such that the terminal connected to the base station 1101 forwards the control channel to the other terminals and the base station transmits the data channel to the terminals 1107, 1109, and 1111.

In this case, the base station 1101 actually transmits the control and data channels for one terminal, i.e. the representative terminal 1119, which generates control channels to a plurality of terminals such that the terminals receive the data streams in the data channel based on the control channels.

Figure 12:
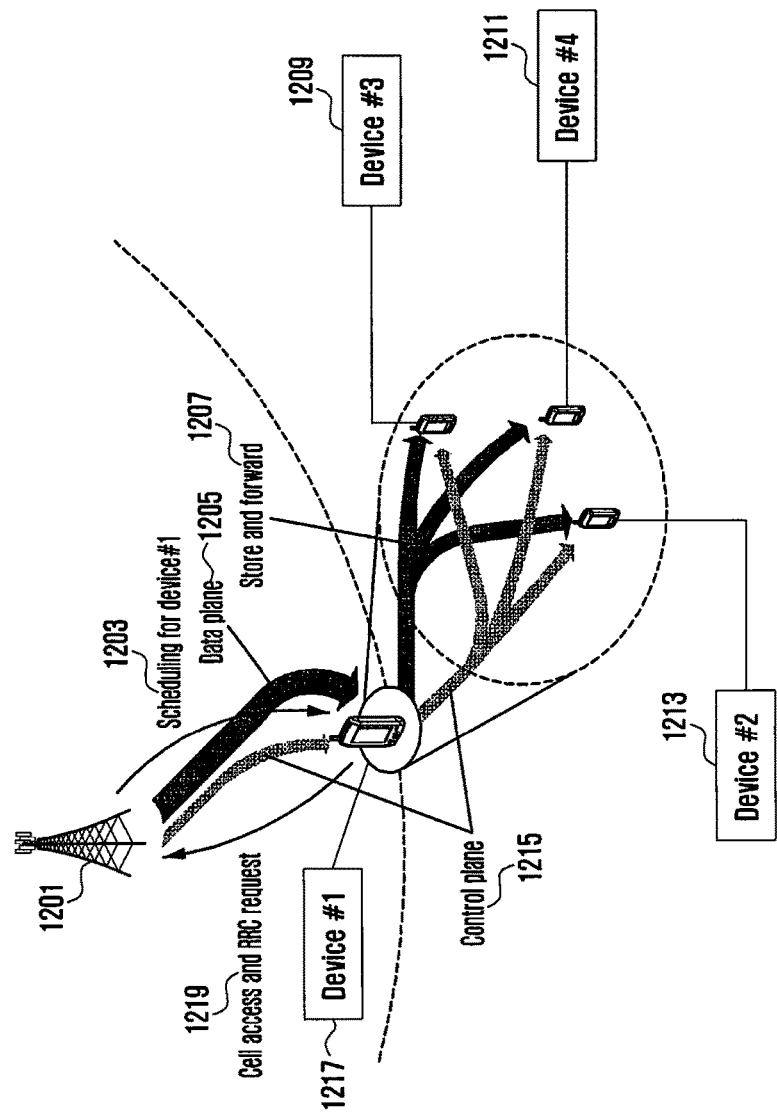
FIG. 12 is a diagram illustrating a data transmission method according to the seventh embodiment of the present invention.

FIG. 12 is a diagram illustrating a data transmission method according to the seventh embodiment of the present invention.

According to the seventh embodiment of FIG. 12, a representative terminal 1217 receives in advance control and data channels from the base station 1201 and generates control and data channels for a plurality of terminals based thereon; at this time, the terminal performs sampling on the received signal and stores the samples in a buffer to reconfigure only the control channel and forward the data channel in a way of transmitting the signal value stored in the buffer to the respective terminals rather than decoding the data channel transmitted by the base station 1201 and then re-encoding the data channel to transmit.

In this way, the representative terminal 1217 is capable of transmitting the data channel to a plurality of terminals without extra decoding.

Figure 13:
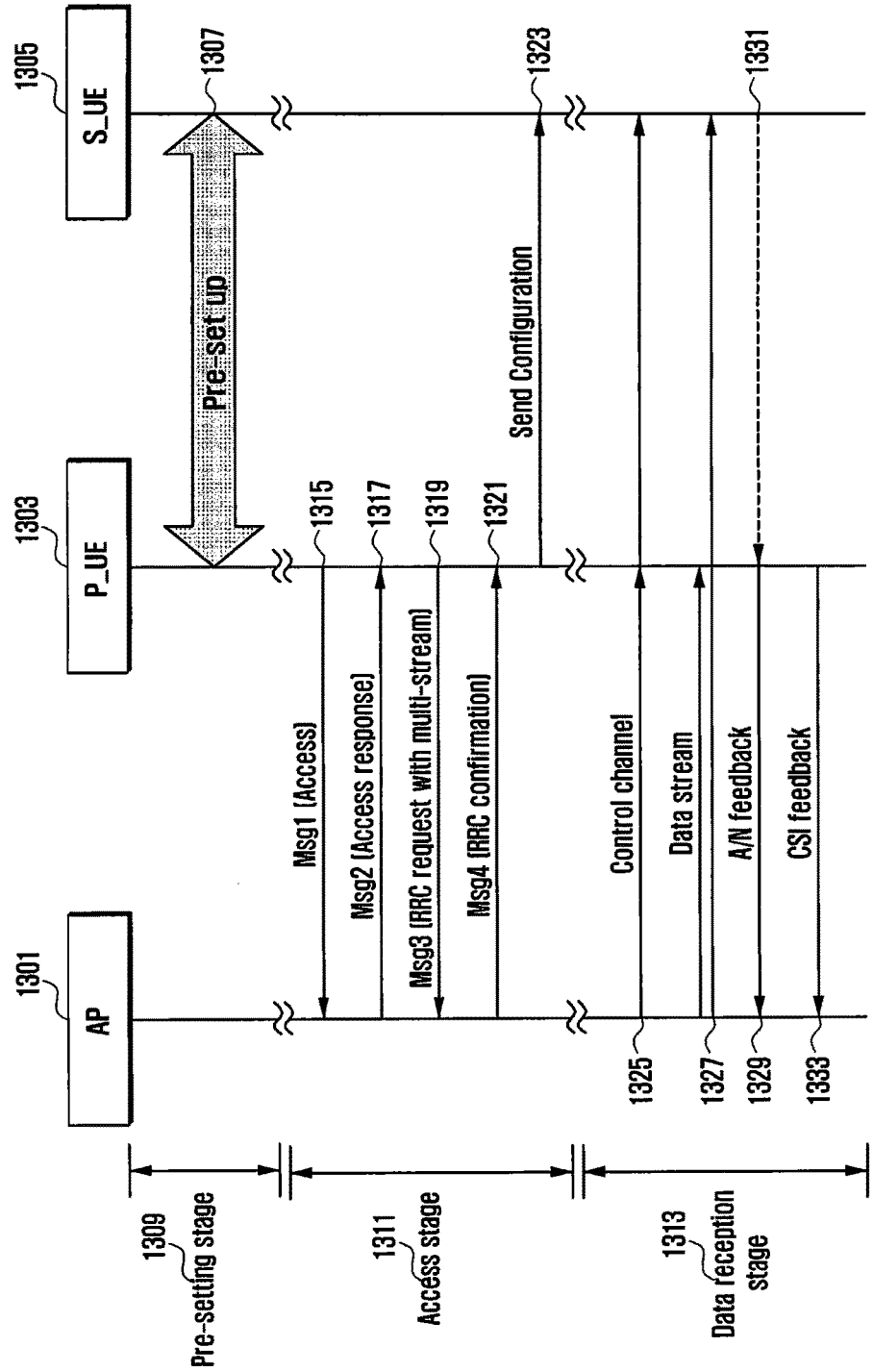
FIG. 13 is a diagram illustrating signal flows between a base station and a terminal according to an embodiment of the present invention.

FIG. 13 is a diagram illustrating signal flows between a base station and a terminal according to an embodiment of the present invention.

FIG. 13 shows a procedure between the base station and terminal according to an embodiment of the present invention. Referring to FIG. 13, the communication procedure between the base station and terminal is divided into three stages. The three stages include a pre-setting stage, an access stage, and a data reception stage.

In the pre-setting stage 1309, the terminal acquires information on the densely located terminals. In the access state 1311, a representative terminal connects to the base station on behalf of plural terminals. Finally, in the data reception state 1313, the terminals receive the data transmitted by the base station and transmit feedbacks corresponding to the data to the base station.

In more detail, the pre-setting stage 1309 is characterized in that the representative terminal 1303 acquires the information on the other terminals 1305 at step 1307 at which the user may register the information with the memory directly or by means of an application or through pairing process of a communication protocol (such as Bluetooth and Wi-Fi) which is different from the protocol for communication with the base station.

In the access stage 1311, the representative terminal 1303 attempts an initial access to the base station at step 1315, and the base station transmits a response signal to the representative terminal at step 1317. Next, the terminal sends the base station an RRC connection message for data channel configuration based on the information from the plural terminals at step 1319, and the base station sends the terminal the configuration for supporting the proposed embodiment at step 1321 to provide the terminals with the corresponding service. Next, the representative terminal 1303 transmits the corresponding information to the paired terminals at step 1323.

In the data reception stage 1313, although the base station configures the control channel for the connected terminal 1303 at step 1325 and transmits the data channel to the connected terminal as configured in the control channel at step 1327, the plural terminals 1305 receive the control channel at step 1325 and data channel at step 1327 to decode the data addressed thereto. The acknowledgement channel corresponding to the data channel may be transmitted by the representative terminal 1303 or by the respective terminals 1305 at step 1329. The channel information may be transmitted by the representative terminal 1303 for use in scheduling the terminals.

Figure 14:
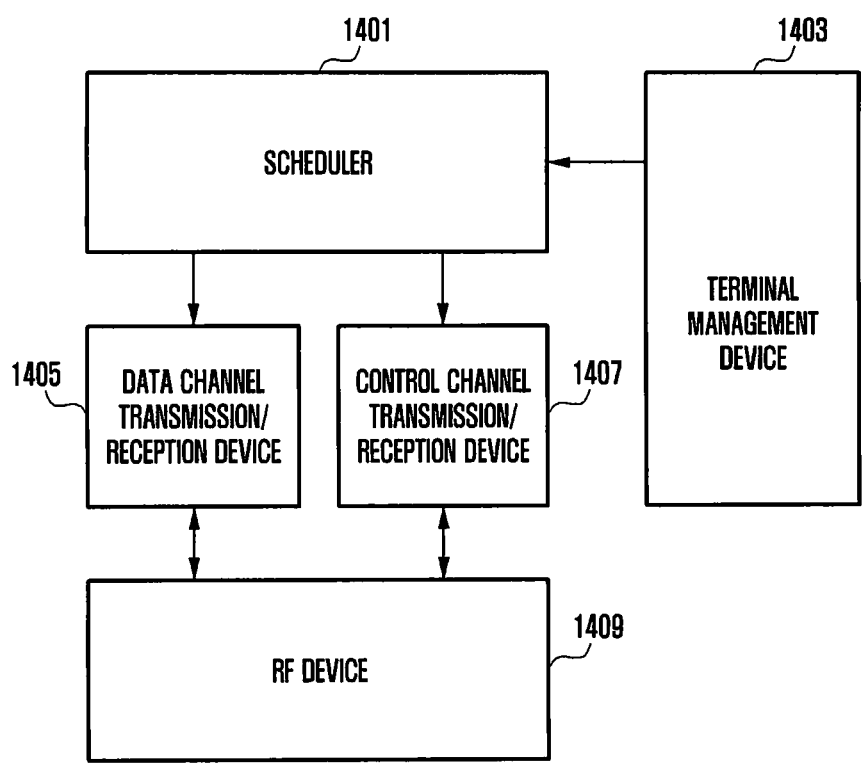
FIG. 14 is a diagram illustrating components of a base station according to an embodiment of the present invention.

FIG. 14 is a diagram illustrating components of a base station according to an embodiment of the present invention.

Referring to FIG. 14, a terminal management device 1403 of the base station is responsible for higher layer signaling and resource configuration in order for one terminal to provide the base station with the information on the densely located terminals and configuring control and data channels by performing scheduling based on the information. The control channel transmission/reception device 1407 configures a control channel based on the information generated by the terminal management device in association with the service streams scheduled by the scheduler 1401 for the respective terminals, and the data channel transmission/reception device 1405 generates the data channels to be transmitted to the respective terminals. The data and control channels are transmitted to the terminal by means of the RF device 1409 of the base station.

Figure 15:
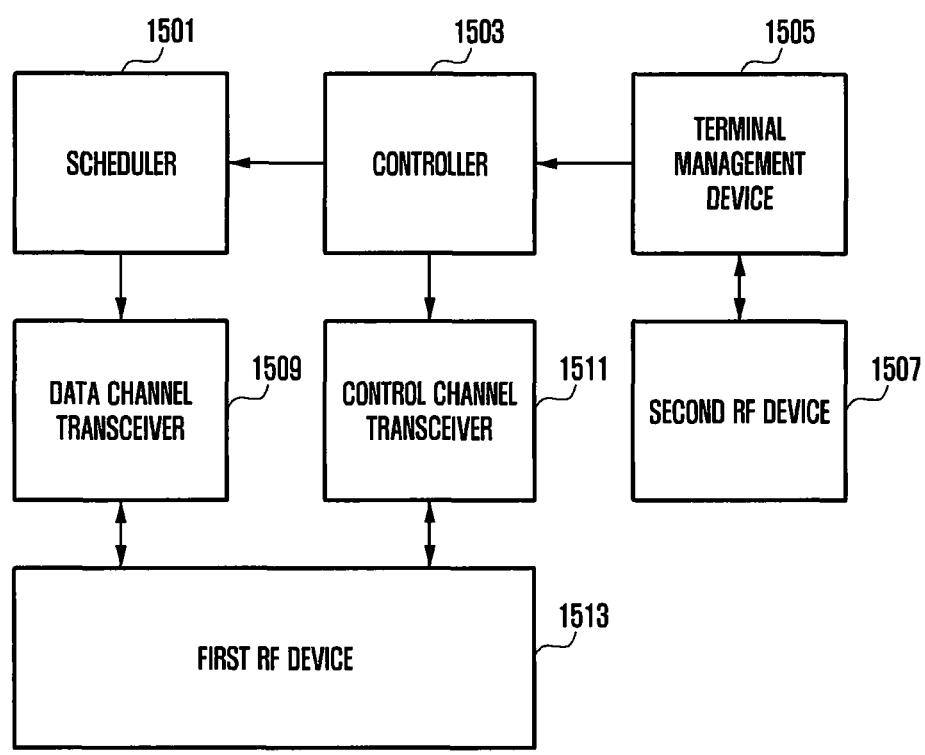
FIG. 15 is a diagram illustrating components of a terminal according to an embodiment of the present invention.

FIG. 15 is a diagram illustrating components of a terminal according to an embodiment of the present invention.

Referring to FIG. 15, the controller 1503 of the terminal determines whether the terminal is a representative terminal by means of the terminal management device 1505 and registers and manages the neighboring devices. The scheduler 1501 of the terminal notifies the data channel transceiver 1509 of the data channel reception scheme and provides the control channel transceiver 1511 with the information for use in receiving the control channel transmitted by the base station. The terminal management device 1505 may use the second communication protocol device 1507 for acquiring information on other terminals.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A communication method of a first terminal in a mobile communication system, the method comprising:
   receiving, from a second terminal, information on the second terminal;
   transmitting, to a base station, a first message for the second terminal based on the information on the second terminal, wherein the first message requests an identifier of the second terminal, and the identifier of the second terminal is used for decoding a control channel configured by the base station for the second terminal;
   receiving, from the base station, a second message including the identifier of the second terminal in response to the first message;
   transmitting, to the second terminal, a third message including the identifier of the second terminal; and
   transmitting, to the base station, channel information between the base station and the first terminal based on a reference signal received from the base station,
   wherein downlink data for the second terminal is transmitted from the base station to the second terminal on a data channel configured by the base station for the second terminal based on the channel information,
   wherein the second terminal receives information on the data channel configured by the base station for the second terminal on the control channel from the base station, and
   wherein the control channel configured by the base station for the second terminal is decoded by the second terminal to acquire the information on the data channel configured by the base station for the second terminal based on the identifier of the second terminal.

2. The method of claim 1, wherein the first message is transmitted to the base station on a higher layer signaling or a physical random access channel.

3. The method of claim 1, further comprising:
   receiving, from the second terminal, feedback information related to the downlink data for the second terminal; and
   transmitting, to the base station, a fourth message for feedback based on the feedback based on the feedback information.

4. The method of claim 1, further comprising:
   transmitting, to the base station, feedback information on the downlink data for the second terminal based on feedback information on downlink data for the first terminal.

5. A signal communication method of a base station in a mobile communication system, the method comprising:
   receiving, from a first terminal, a first message for a second terminal based on information on the second terminal, wherein the first message requests an identifier of the second terminal, and the identifier of the second terminal is used for decoding a control channel configured by the base station for the second terminal; and
   transmitting, to the first terminal, a second message including the identifier of the second terminal in response to the first message;
   receiving, from the first terminal, channel information between the base station and the first terminal based on a reference signal transmitted to the first terminal;
   configuring a control channel and a data channel for the second terminal based on the channel information, and transmitting information on the data channel for the second terminal on the control channel to the second terminal; and
   transmitting, to the second terminal, downlink data for the second terminal on the data channel for the second terminal,
   wherein the control channel for the second terminal is decoded by the second terminal to acquire the information on the data channel for the second terminal based on the identifier of the second terminal.

6. The method of claim 5, wherein a first message is transmitted to the base station on a higher layer signaling or a physical random access channel.

7. The method of claim 5, further comprising:
   receiving, from the first terminal, a third message for feedback based on feedback information related to the downlink data for the second terminal.

8. The method of claim 5, further comprising:
   receiving, from the first terminal, feedback information on the downlink data for the second terminal based on feedback information on downlink data for the first terminal.

9. A communication method of a second terminal in a mobile communication system, the method comprising:
   transmitting, to a first terminal, information on the second terminal;
   receiving, from the first terminal, a first message including the identifier of the second terminal allocated from a base station;
   acquiring information on a data channel configured by the base station for the second terminal by decoding a control channel configured by the base station for the second terminal based on the identifier of the second terminal; and
   receiving, from the base station, downlink data for the second terminal on the data channel configured by the base station for the second terminal based on channel information between the base station and the first terminal.

10. The method of claim 9, wherein the information on the second terminal is transmitted from the first terminal to the base station on a higher layer signaling or a physical random access channel.

11. The method of claim 9, further comprising:
    transmitting, to the first terminal, feedback information related to the downlink data for the second terminal,
    wherein a first message for feedback is transmitted from the first terminal to the base station based on the feedback information.

12. The method of claim 9, wherein feedback information on the downlink data for the second terminal is transmitted from the first terminal to the base station based on feedback information on downlink data for the first terminal.

* * * * *